United States Patent [19]

Meraj et al.

[11] Patent Number: 4,761,290
[45] Date of Patent: Aug. 2, 1988

[54] PROCESS FOR MAKING DOUGH PRODUCTS

[75] Inventors: Paul Meraj, Encino; Teri Nagle, Alta Loma, both of Calif.

[73] Assignee: General American Foods Manufacturing Corporation, Sylmar, Calif.

[21] Appl. No.: 4,987

[22] Filed: Jan. 20, 1987

[51] Int. Cl.⁴ ............................................. A21D 10/00
[52] U.S. Cl. ........................................ 426/90; 426/92; 426/94; 426/95; 426/290; 426/291; 426/107
[58] Field of Search .................. 426/290, 291, 94, 92, 426/95, 107, 90

[56] References Cited

U.S. PATENT DOCUMENTS

| | | | |
|---|---|---|---|
| 1,483,704 | 2/1924 | Wilcox | 426/290 |
| 4,190,757 | 2/1980 | Turpin et al. | 426/107 X |
| 4,283,427 | 8/1981 | Winters et al. | 426/107 |
| 4,645,673 | 2/1987 | Wilmes | 426/94 |

*Primary Examiner*—Joseph Golian
*Attorney, Agent, or Firm*—Nilsson, Robbins, Dalgarn, Berliner, Carson & Wurst

[57] ABSTRACT

Dough products convertible by heating to light, flaky, crispy dough products are produced by applying shortening flakes to a dough, coating a light batter upon the dough product and heating the batter-coated dough to first set the batter and then subsequently melt the shortening flakes, thereby forming air cells within the batter and at the surface of the dough.

9 Claims, No Drawings

PROCESS FOR MAKING DOUGH PRODUCTS

BACKGROUND OF THE INVENTION

This invention relates to dough products. In one of its more particular aspects, this invention relates to a process for making dough products capable of crisping by baking or heating with microwaves.

The advent of convenience frozen foods and particularly foods designed for quick baking or warming in a microwave oven has produced a variety of comestibles differing in their texture, consistency and palatability. Although many such foods have become available, there is a need for improving the appearance and taste of such products.

Various types of coatings have been used to simulate the appearance and taste of fried foods. U.S. Pat. No. 3,586,512 describes a blended food coating composition including a farinaceous material, powdered fat, a hydrophilic binder, flavoring and edible water soluble dyes.

U.S. Pat. No. 3,843,827 describes the use of two dry mixes, the first including raw egg, milk or water, wheat flour, shortening, corn starch and pregelatinized waxy maize starch, which forms a batter, and a second mix including cereal fines, pregelatinized waxy maize starch, shortening and wheat flour.

U.S. Pat. No. 4,199,603 describes coating frozen comestibles with an edible oil which is fluid at room temperature but solid at the temperature of the frozen comestible and a moisture absorbing substance dispersed in the oil. The oil coated comestible is then further coated with a crisp, dry particulate.

Dough products suitable for finish cooking by baking or exposure to microwaves are also known.

U.S. Pat. No. 4,170,659 describes a fried dough shell product in which controlled blister development during cooking results in a moist, tender, bready interior and a crusty surface.

U.S. Pat. No. 4,208,441 describes a baked dough product made by expanding dough into pockets in cooking irons to provide a cooked dough body having a crisp, relatively firm exterior and a soft, moist, bready interior.

U.S. Pat. No. 4,590,083 describes rapid-cooking noodles prepared by adding an edible emulsifier or fat which is solid at room temperature in particulate form to a wheat flour mix to form a dough and steam-heating to melt the emulsifier oil or fat, producing holes in the dough and increasing the porosity thereof.

Although efforts have been made to provide dough products which can be finish cooked to a light, flaky, crispy texture, these efforts have not been wholly successful. In large measure, instead of the desired light, flaky, crispy texture, the cooked products have been found to be leathery, in the case of baked products, or soggy in the case of microwave heated products. The sogginess of microwave heated products is due to the characteristics of microwaves, which heat from the inside of the food to the outside. During the process of heating, moisture is driven to the surface resulting in a soggy product. Recently, microwave susceptors have been used to reduce the moisture at the surface of microwave heated foods. These susceptors constitute lossy microwave energy absorbers which become hot when exposed to microwave radiation. When positioned adjacent the surface of a food being heated in a microwave oven, the susceptors promote browning of the food. Such susceptors are sometimes used in the form of a card referred to as a microwave card or browning card. Typical microwave susceptors are described in U.S. Pat. Nos. 4,190,757 and 4,283,427, the disclosures of which are hereby incorporated by reference. The use of microwave susceptors improves the browning of microwave heated food and reduces the amount of moisture at the surface thereof, but frequently results in the production of a hard, crusty surface in the case of dough products.

It is accordingly a principal object of the present invention to provide dough products suitable for freezing and finish cooking to a light, flaky, crispy texture.

Another object of this invention is to provide a process for the production of such dough products which is simple and inexpensive to use.

Other objects and advantages of the present invention will become apparent in the course of the following detailed description.

SUMMARY OF THE INVENTION

The present invention provides a dough product which is suitable for freezing and finish cooking by baking or irradiation with microwaves using a microwave susceptor. The process by which the improved dough product of the present invention is produced includes the steps of providing a dough, applying shortening flakes to at least one side of the dough, coating a light batter over the dough having the shortening flakes applied to it, heating the resulting batter-coated dough to first set the batter and then subsequently melt the flakes to form pinholes or air cells in the batter and at the surface of the dough, and then cooling the resulting product. The process is applicable to any dough product which is desired to have a light, flaky, crispy texture.

DESCRIPTION OF THE PREFERRED EMBODIMENT

Typical dough products which can be prepared according to the process of the present invention include bread, bagels, pizza and similar products. Ordinarily, when such dough products are heated, they tend to become chewy, hard or crusty, depending on the method of heating used. The process of the present invention is effective in providing a dough product which can be finish cooked to a light, flaky, crispy texture.

One of the preferred embodiments of the present invention provides a dough enrobed product, that is, one in which a meat, fish, vegetable or fruit filling has a layer of dough completely surrounding it. The process of the present invention is particularly effective in providing foods of this type, because the process permits the food inside the pocket sandwich to remain moist while providing a light, flaky, crispy dough covering.

The process of the present invention consists overall in applying a layer of shortening flakes between the dough and a light batter which is applied to the dough, setting the batter and subsequently melting the shortening flakes present in the set batter in order to form pin holes or air cells in the batter and at the surface of the dough. Upon finish cooking, these pinholes or air cells form a porous product and permit the batter to be quickly heated and browned, resulting in a dough product having a light, flaky, crispy texture to the pocket.

Shortening flakes are commercially available, for example, as the products marketed by Durkee Foods under the trademarks Kristel Gold, Paramount or Kaomel. Such flakes have a size within the range of ⅛ to 1½ inches and have a melting point within the range of about 97° F. to 125° F. Although high melting shortening flakes, that is, shortening flakes melting at about 120 degrees F. or higher can be used in the process of the present invention, it has been found that it is more desirable to utilize lower melting shortening flakes. This is for the reason that use of the higher melting shortening flakes results in a product which is observably greasy causing coating of the tongue upon eating the product. Low melting shortening flakes, for example, shortening flakes that melt in the range of body temperature, have not been observed to produce this effect. However, if low melting shortening flakes are used, it is essential to keep them in a refrigerated state below about 40° F. Alternatively, butter, lard, margarine or a liquid shortening may be frozen and then cut into very small thin flakes. It is generally desirable to maintain the shortening flakes frozen in order that they have a hard consistency. This is so that the flakes can form tiny impressions in the surface of the dough to which they are applied and so that they will adhere to the dough without melting. This can be accomplished by means of refrigeration or by using a stream of carbon dioxide gas. The shortening flakes should be kept at a temperature within the range of about 0° F. to 40° F. and preferably at a temperature not greater than about 10° F. In applying the shortening flakes to the dough, it is preferable to cover at least one surface of the dough with a thin layer of shortening flakes. The amount of shortening flakes used determines the porosity of the end product after finish cooking. Accordingly, more or less shortening flakes should be used dependent upon whether it is desired to have a lighter, more porous dough surface or one that is somewhat less porous.

In a preferred embodiment of the invention, frozen shortening flakes are pressed into the surface of a dough in order to provide air cells at the surface of the dough as well as in the batter upon melting of the shortening flakes.

Following application of the shortening flakes to the dough, the next step in the process is the application of a light batter. For this purpose, any type of batter which is used in cooking is satisfactory. It is convenient to apply the batter by immersing the dough in a batter bath. The batter bath is generally maintained at near ambient temperatures, preferably at a temperature within the range of about 65 to 80 degrees F. The thickness of the batter when applied to the dough should be in the range of about 0.001 inch to 0.125 inch. Batters of a thickness greater than about 0.125 inch will not result in the ultimate product after finish cooking having the desired degree of crispness. Excess batter is drained off before baking.

The baking step, which is the next step in the process, takes place in a suitable oven, preferably a convection oven in which heated air is circulated. Baking results first in setting the batter and then melting the shortening flakes. This sequence of steps can be accomplished by quickly heating to a temperature in the range of about 400 degrees F. to 850 degrees F. for a period of time ranging from about 10 seconds to 5 minutes depending upon the type of dough product being processed and the temperature at which the dough is introduced into the oven. Typically, the dough, when introduced into the oven, may be at a temperature within the range of about 65° F. to 90° F. depending on whether yeast raised dough, chemically leavened dough or unleavened dough is employed.

Melting of the shortening flakes after the batter has set causes the formation of pinholes or air cells in the batter and dough upon baking. The presence of such air cells results in a light, flaky and crispy texture and facilitates browning upon finish cooking.

Following melting of the shortening flakes, the resulting product is cooled and desirably frozen for shipment and storage.

The product thus provided can be finish cooked in either a conventional oven or a microwave oven using a microwave susceptor. Cooking in a conventional oven requires significantly more time than cooking in a microwave oven. The end product is a highly palatable dough product which has the desirable organoleptic properties of a fried food product without the disadvantages thereof and is characterized by having a light, flaky, crispy texture.

The process of the present invention results in a very substantial improvement in microwave cooked dough products and a significant improvement in dough products baked in a conventional oven.

The invention will be better understood by reference to the following examples which illustrate the preparation of various dough products according to the process of the present invention.

EXAMPLE 1

Leavened dough at a temperature of 83°–89° F. is covered on one side with shortening flakes kept frozen by means of a carbon dioxide stream. The shortening flakes are Kaomel brand from Durkee Foods, having a melting point of 97–101 degrees F. The flakes are maintained at a temperature below 10° F. The shortening flakes are first uniformly dispersed on the surface of the dough by means of a vibrating screen and then pressed into the surface of the dough by means of a stainless steel roller. The dough is then cut into strips 4½ to 5½ inches long, ½ inch thick and 3 inches wide. Appropriate filling is then placed upon the centers of the dough strips. The dough is then folded over forming a pocket and the sides are crimped. The pockets are then immersed in a batter bath consisting of water, flour, egg, whey, oil, leavening, sugar and salt at a temperature of 65 to 80 degrees F., removed from the bath and excess batter permitted to drain for a period of 5 to 10 seconds resulting in a batter 0.005 to 0.010 inch thick. The pockets are then placed in a multizoned convection oven, baked for 2½ to 3½ minutes at temperatures ranging from 680 to 850 degrees F., removed from the oven, cooled to room temperature and packaged in wrappers containing a microwave susceptor sleeve.

EXAMPLE 2

Dough is extruded in a flat sheet approximately ¼ inch thick and cut into circles for pizza crust. The dough is then sprinkled with frozen shortening flakes and passed under a roller to press the flakes into the surface of the crust. The coated pizza dough is then passed under a batter curtain to apply a thin coat of batter to the top surface of the dough. Excess batter is allowed to drain or is blown off by means of an air stream directed at the battered surface. Coated dough circles are then placed in a multizoned convection oven at a temperature of 680° F. to 850° F. The baked circles are then cooled. The cooled dough circles are then dropped, coated side down, onto a belt and pizza sauce and toppings are applied to the uncoated side of the baked dough circles. The finished pizza is then frozen and packaged in trays containing a microwave susceptor.

The present invention provides unique dough products having desirable organoleptic properties which are characterized by a greater degree of lightness, flakiness and crispiness, than in previously available foods.

The foregoing description of the invention has been directed to particular preferred embodiments for purposes of explanation and illustration. It will be apparent, however, to those skilled in the art, that many modifications and changes in the particular methods and materials may be made without departure from the scope and spirit of the invention. It is applicant's intention in the following claims to cover all such equivalents, modifications and changes that fall within the true spirit and scope of the invention.

What is claimed is:

1. A process for producing a dough product which is convertible upon finish cooking by baking or exposure to microwaves in the presence of a microwave susceptor into a cooked dough product having a light, flaky, crispy texture, which comprises the steps of:
   providing a dough;
   applying a layer of shortening flakes to at least one side of said dough;
   coating a light batter to a thickness in the range of about 0.001 inch to 0.125 inch over said at least one side of said dough to which said shortening flakes have been applied;
   heating the resulting batter-coated dough to a temperature in the range of about 400° F. to 850° F. for a period of time ranging from about 10 seconds to 5 minutes to first set said batter and then subsequently melt said shortening flakes, whereby air cells are formed in said batter and the surface of said dough; and
   cooling the resulting dough product.

2. A process according to claim 1 wherein said shortening flakes have a melting point within the range of about 45 degrees F. to 125 degrees F.

3. A process according to claim 1 wherein said shortening flakes are applied at a temperature of less than about 40° F.

4. A process according to claim 1 wherein said shortening flakes are cooled to a temperature below about 10° F. and pressed into the surface of said dough.

5. A process according to claim 1 wherein said light batter is coated to a thickness of about 0.005 inch to 0.010 inch.

6. A process according to claim 1 wherein the resulting batter-coated dough is heated to a temperature in the range of about 680° F. to 850° F.

7. A dough product produced according to the process of claim 1.

8. A process for providing a dough product which is convertible upon finish cooking in a microwave oven into a cooked dough product having a light, flaky, crispy texture, which comprises the steps of:
   providing a dough selected from the group consisting of yeast raised dough, chemically leavened dough and unleavened dough;
   applying a layer of shortening flakes to at least one side of said dough;
   coating a light batter to a thickness in the range of about 0.001 to 0.125 inch over said at least one side of said dough to which said shortening flakes have been applied;
   heating the resulting batter-coated dough to a temperature in the range of about 400° F. to 850° F. for a period of time ranging from about 10 seconds to 5 minutes to first set said batter and then subsequently melt said shortening flakes, whereby air cells are formed in said batter and the surface of said dough;
   cooling the resulting dough product; and
   packaging the dough product with a microwave susceptor.

9. A product produced according to the process of claim 8.

* * * * *

UNITED STATES PATENT AND TRADEMARK OFFICE
CERTIFICATE OF CORRECTION

PATENT NO.     : 4,761,290
DATED          : August 2, 1988
INVENTOR(S)    : Paul Meraj and Teri Nagle It is certified that error appears in the above-identified patent and that said Letters Patent is hereby corrected as shown below:

Column 5,
Line 35, "to" should read -- at --

Column 6,
Lines 14 and 31, "to" should read -- at --

Signed and Sealed this

Twenty-ninth Day of June, 2004

JON W. DUDAS
*Acting Director of the United States Patent and Trademark Office*